G. H. Hubbard,
Attaching Augers to Handles.
N° 12,484.   Patented Mar. 6, 1855.
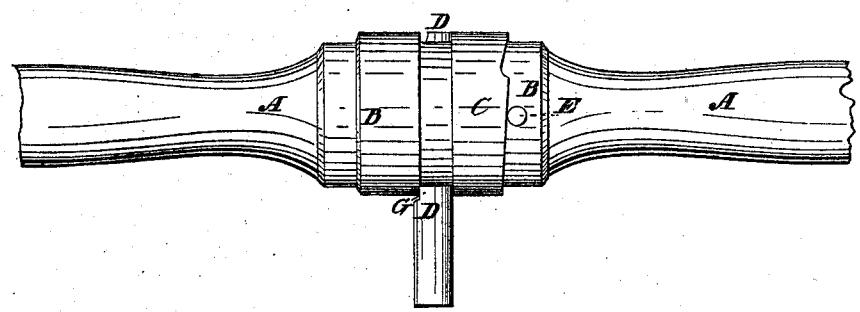
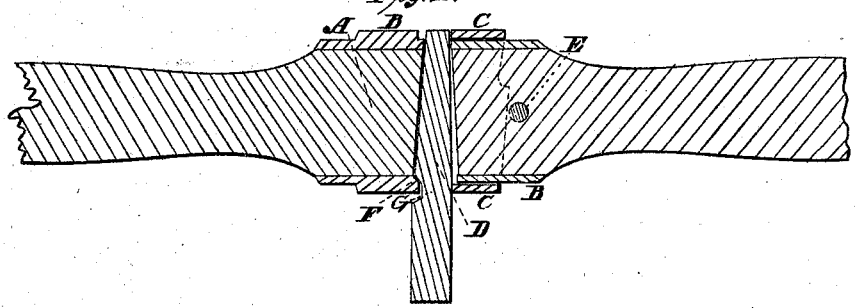
Witnesses:  
S. H. Reed  
David Millard
Inventor:  
Guy H. Hubbard

UNITED STATES PATENT OFFICE.

GUY H. HUBBARD, OF SHELBURNE FALLS, MASSACHUSETTS.

AUGER-HANDLE FASTENING.

Specification of Letters Patent No. 12,484, dated March 6, 1855.

*To all whom it may concern:*

Be it known that I, GUY H. HUBBARD, of Shelburne Falls, in the county of Franklin, in the State of Massachusetts, have invented a new and Improved Auger-Handle Fastening; and I do hereby declare that the following is a full and exact description thereof, reference being had to the accompanying drawings and to the letters of reference marked thereon.

I construct my auger handle of one entire piece of suitable wood, and inclose the middle portion with a substantial ferrule of iron, or other suitable metal, marked B, and also form a frusto pyramidal socket, to receive the shank D, of the auger or other implement, entirely through both the ferrule B, and the handle A. In one side of the shank D, is formed the notch G, fitted to correspond with and in part fit upon, the beveled side F, of the socket within the ferrule, which said beveled side or part of the ferrule, constitutes a firm and secure catch, for the purpose of retaining said shank D, within the socket. I also place concentrically upon said ferrule B, the loosely fitting ring C, which is easily revolved about the said ferrule, by being grasped by the thumb and finger of the operator. One edge of this ring C, is fitted to impinge the shank D, at the points where said shank protrudes from the socket. The other edge of the ring C is formed in two inclined planes, thus giving the ring the form of two semicircular wedges, connected at their extremities. Each of these inclined planes has a proper bearing against the pin E, which pin being driven entirely through the handle and ferrule both ends are left projecting sufficiently to form said bearings for the ring C.

In order to use and operate this improved fastening it is only necessary to place the ring C with the narrowest parts thereof resting upon the pin E, and insert the shank D, of the auger, or any other implement designed to be employed, within the socket, in the manner represented in the accompanying drawings, with the notch G, entered upon the catch F, as aforesaid. Then by causing the ring C to revolve, in part, around the ferrule B and thus causing the inclined edge thereof to operate against the pin E, the said ring C is pressed against the shank D and hence presses said shank firmly upon the catch F; and it will also be seen that in consequence of the ring C being loosely fitted upon the ferrule B, said ring is at liberty to change slightly its position, laterally, and thereby adapt itself to any slight variation in the fitting of different shanks within and through the socket; while it, at the same time impinges and firmly secures the shank upon the catch F and thereby effectually secures the attaching of the auger or other implement to the handle, for all the purposes to which such implements are applied. It will be seen, also, that it excels very many other fastenings in cheapness of manufacture; great ease of operating; and great durability of all the several parts.

I have in some instances, instead of forming the catch F to enter the notch G, caused the plane edge of the ring C to enter a suitably formed notch or groove in the shank D, which can with equal facility be done, although I prefer the form herein set forth. And I do not confine myself to the precise form and position of the several parts, but shall vary the same, while I attain the same end and object by the forms represented or their mechanical equivalents.

I do not claim the ferrule B which has been previously employed, but

What I do claim as my invention and desire to secure by Letters Patent, is—

The ring C, constructed, arranged and operating in the manner and for the purposes herein set forth or other manner substantially the same.

GUY H. HUBBARD.

Witnesses:
DAVID WILLARD,
S. H. REED.